United States Patent [19]

Coers

[11] Patent Number: 4,969,853
[45] Date of Patent: Nov. 13, 1990

[54] READILY REMOVABLE SEPARATOR MODULE

[75] Inventor: Bruce A. Coers, Hillsdale, Ill.

[73] Assignee: Deere & Company, Moline, Ill.

[21] Appl. No.: 451,284

[22] Filed: Dec. 15, 1989

[51] Int. Cl.$^5$ .............................................. A01F 7/06
[52] U.S. Cl. ........................................ 460/80; 460/69
[58] Field of Search ................ 460/80, 79, 66, 69, 460/59, 73, 111–113; 241/186.3, 186.4; 56/122

[56] References Cited

U.S. PATENT DOCUMENTS

| 4,611,606 | 9/1986 | Hall et al. | 460/80 |
| 4,669,489 | 6/1987 | Schraeder et al. | 460/112 |
| 4,733,672 | 3/1988 | Tophinke | 460/80 |
| 4,739,773 | 4/1988 | West et al. | 460/80 X |
| 4,884,994 | 12/1989 | Hall et al. | 460/80 X |

Primary Examiner—Thuy M. Bui

[57] ABSTRACT

The invention is directed to an assembly for readily removing an axial separator from an agricultural combine. The axial separator is positioned within the combine side sheets by rails that are secured to the sides of the side sheets. A sprocket type wheel mounted on the combine engages the rails. The separator is also provided with guide wheels and guide pins facilitating the axial movement within the combine. A locking assembly located at the rear of the separator can be bolted to the guide rails. A transverse lifting pin is located to the rear of the combine to facilitate removal of the separator module from the combine. Movement of the axial separator within the combine is controlled by a worm gear assembly that can be manually actuated by a crank arm.

16 Claims, 4 Drawing Sheets

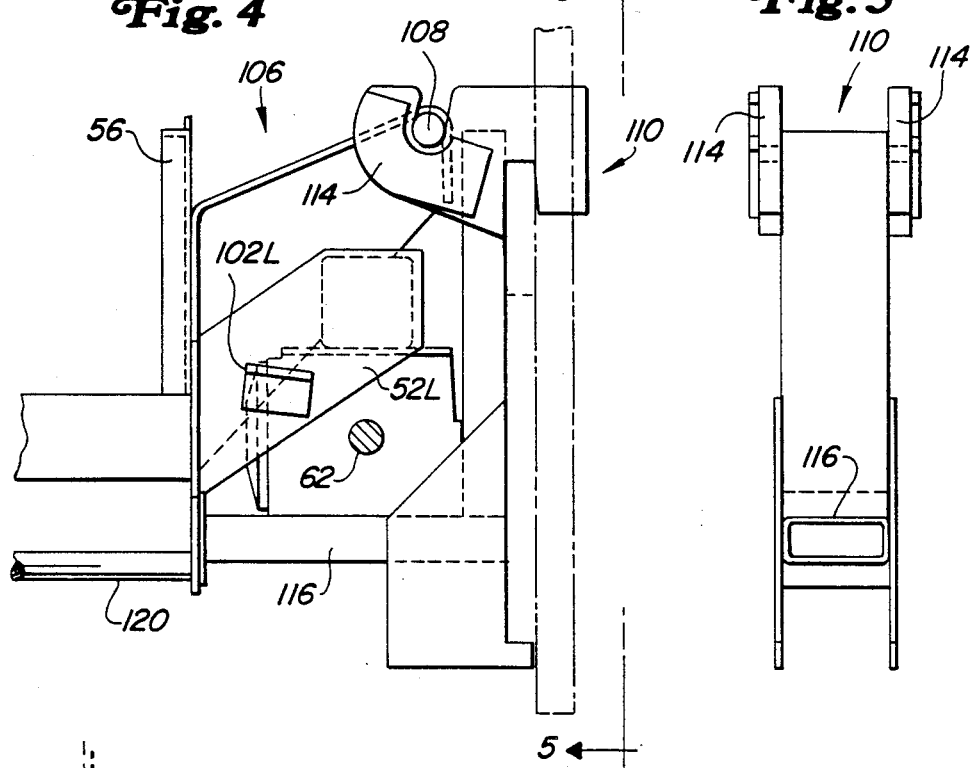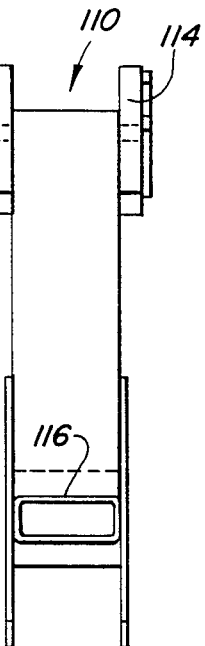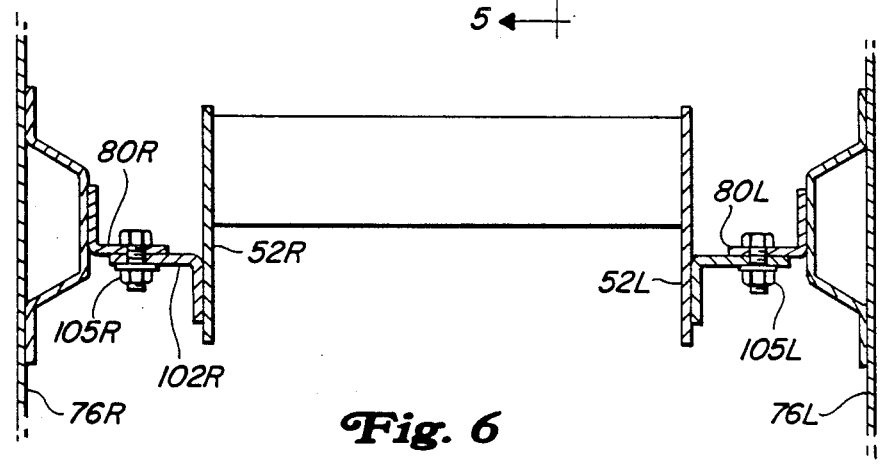

READILY REMOVABLE SEPARATOR MODULE

BACKGROUND OF THE INVENTION

1. Field of the Invention

The invention is directed to a system for readily removing an axial separator module from an agricultural combine.

2. Description of the Prior Art

In threshing a harvested crop, the grain is separated from the straw and chaff and deposited into a holding tank. With conventional combines the harvested crop is directed to a transversely mounted threshing cylinder and concave which threshes the crop separating the grain from the straw. The residue is then directed to the beater further separating the grain from the straw. The straw residue to then passed over oscillating apertured straw walkers which direct the straw out of the back of the combine while allowing additional grain to fall through the apertures. Grain and chaff falling from the threshing concave and straw walkers is then directed to a cleaning shoe for separating the chaff from the grain. A blower assembly is used in this final step to blow the lighter chaff away from the heavier grain.

In an axial flow combine, the grain is directed to a cylindrical tube housing a rotor. The harvested crop is threshed and separated in the cylindrical tube with the grain and chaff falling therefrom in a manner similar to the conventional combine. A hybrid machine was disclosed by the assignee of the present invention, in U.S. Pat. No. 4,739,773, wherein a conventional transverse concave and threshing cylinder is used in conjunction with an axial separator.

U.S. Pat. No. 4,669,489, assigned to the assignee of the present invention, discloses a readily movable straw chopper. The straw chopper can be positioned along two apertured rails. A cooperating sprocket located on the straw chopper is used to position the straw chopper along the apertured rails.

SUMMARY OF THE INVENTION

The present invention comprises an assembly for readily removing an axial separator module from the rear of a combine. The assembly comprises two apertured rails extending parallel to one another forming an axial track. Both rails are mounted to the supporting structure of the combine. The separator module is provided with sprocket-type wheels that engage the track for axially removing the separator module. Guide wheels are mounted to the front of the separator module and also ride on the axial track. The sprocket-type wheels are provided with a drive means comprising a worm gear assembly. The worm gear assembly is provided with an axial drive shaft that extends to the rear of the combine and which can be engaged by a manual crank arm. The separator module is locked in place by a locking bracket that is bolted to the apertured rails. A transverse pin located at the rear of the separator module forms a lifting assembly for carrying the separator module after it has been removed from the combine.

BRIEF DESCRIPTION OF THE DRAWINGS

FIG. 4 is a side view of a lifting means together with a corresponding lifting apparatus.

FIG. 5 is a front view of the lifting apparatus.

FIG. 6 is a front view of a locking means.

DETAILED DESCRIPTION OF THE PREFERRED EMBODIMENT

Figure 1:
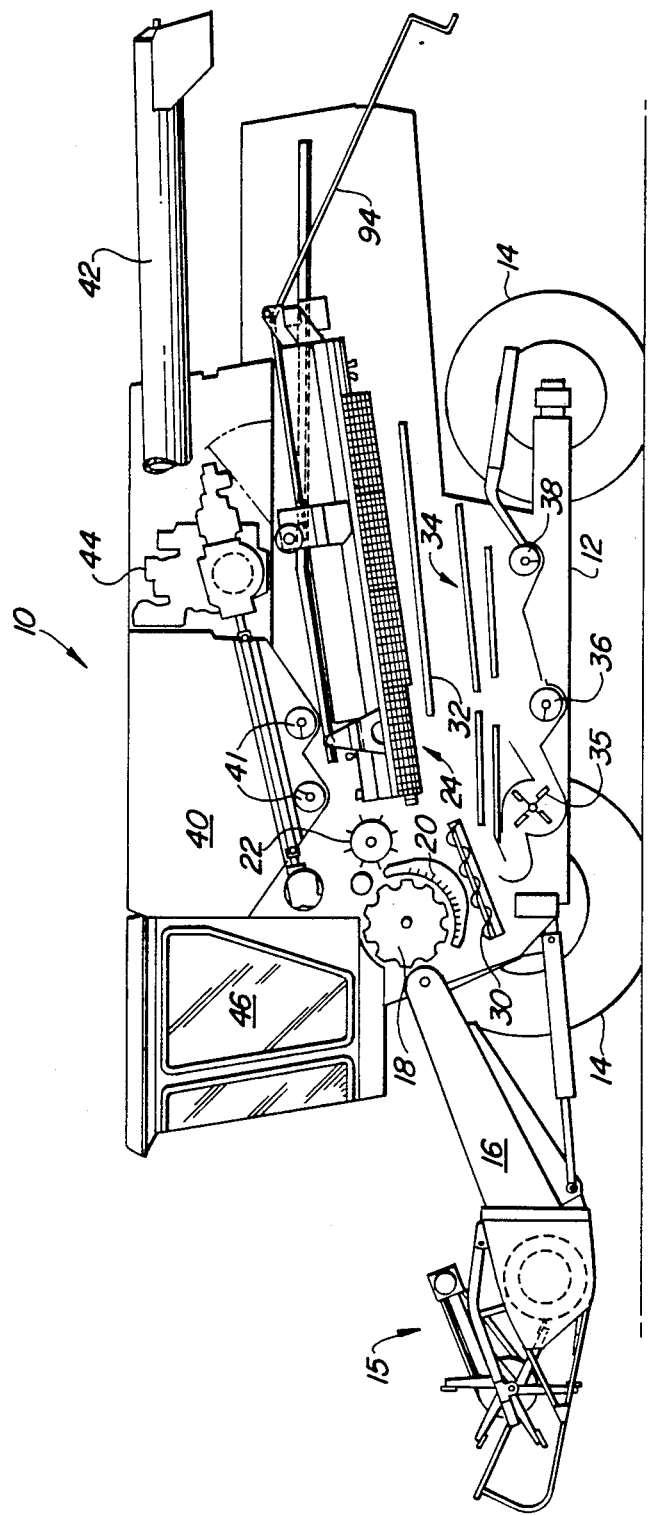
FIG. 1 is a semi-schematic side view of a combine having an axial flow separator.

FIG. 1 illustrates a self-propelled combine 10 having supporting structure 12 from which depend ground engaging wheels 14. The ground engaging wheels are driven by a propulsion means (not shown), for moving the combine across a field. The forward part of the combine is provided with a harvesting platform 15 for harvesting a crop in a field and directing the crop up through the feeder house 16 to the threshing and separating means. The threshing and separating means comprises transverse threshing cylinder 18 and associated concave 20 to which the crop is initially directed. The threshed crop is then directed to the beater 22 from which it enters axial separator means 24. Axial separator 24 is better described in U.S. Pat. No. 4,739,773, which is incorporated herein by reference.

Grain and chaff falling from the threshing and separating means falls onto auger 30 and shaker pan 32 which directs the crop to cleaning shoe 34. The cleaning shoe is provided with a blower assembly 35 to assist in separating the grain from the chaff. Clean grain is driven by clean grain cross auger 36 to an elevator (not shown) which directs the grain to grain tank 40. Tailings cross auger 38 directs unthreshed heads back to the threshing means through another elevator (not shown). The clean grain 40 is unloaded from tank 40 through an unloading system comprising cross augers 41 and unloading auger 42. All the various systems are driven by internal combustion engine 44 which is controlled by the operator stationed in operator's cab 46.

Figure 2:
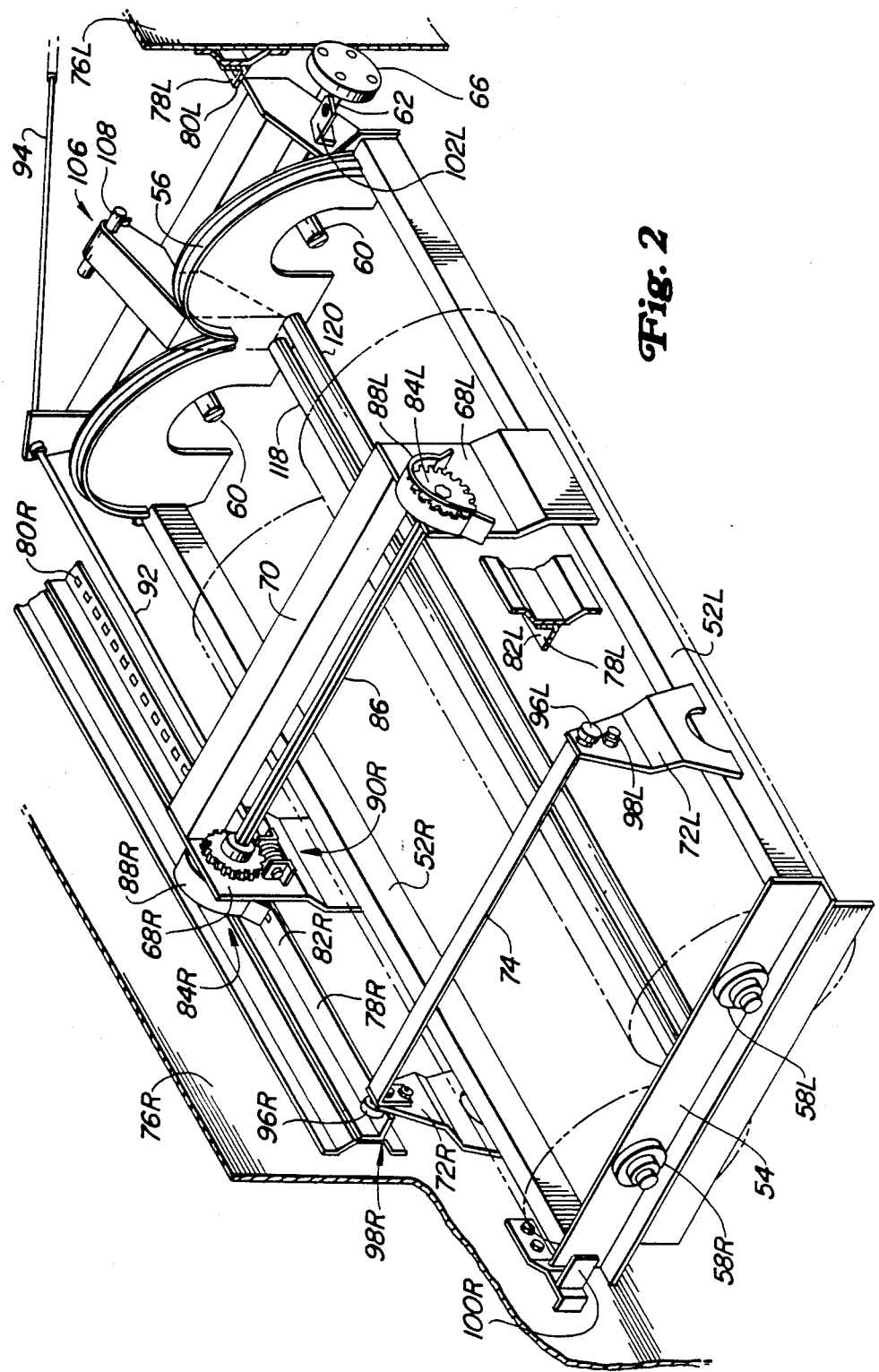
FIG. 2 is a perspective view of the means for readily removing the separator module.

As illustrated in FIG. 2, the axial separating means 24 is provided with left and right side rails 52L and 52R which are welded to front plate 54 and end plate 56. Front plate 54 is provided with bearings 58L and 58R for receiving rotor shafts 60L and 60R of the separator means. Rotors 60L and 60R are driven by transverse drive shaft 62 having sheave 66 which are operatively coupled to rotors 60 through a bevel gear assembly (not shown).

The axial separating means is also provided with upstanding left and right plates 68L and 68R which are welded to the middle portions of side rails 52L and 52R, respectively. Tubular member 70 is welded between upstanding plates 68L and 68R across the top of the separator means. A second set of left and right upstanding plates 72L and 72R are welded to the forward portions of side rails 52L and 52R respectively. A cross member 74 is welded between upstanding plates 72L and 72R across the top of the separator means.

The separator means is located between left and right side sheets 76L and 76R of the supporting structure of the combine. An axial track is welded to each side sheet and comprises first and second axial rails 78L and 78R. As illustrated in FIG. 1, the rails are bent near their mid point to accommodate the downwardly sloping nature of the axially separator means. The axial rails have apertured portions 80L and 80R that are provided with square apertures. The apertured portions of the rail are substantially horizontal with the ground. The rails are also provided with solid portions 82L and 82R that are downwardly sloping from the horizontal apertured portions.

First and second wheels 84L and 84R are mounted to outstanding plates 68L and 68R, respectively, and are coupled to one another by hex shaft 86. First and second wheels 84L and 84R are provided with radially projecting portions that engage the apertures formed in the aperture portions of the side rails. These wheels are also shielded from debris by shields 88L and 88R.

A worm gear assembly 90 is used to drive hex shaft 86 and thereby the first and second wheels. The worm gear assembly is provided with an axial drive shaft 92 that extends to the rear of the axial separator means. The end of axial drive shaft 92 is provided with a coupling assembly 93 to which manual crank 94 can be readily attached. This coupling can be similar to the ones used on automobile jacks. A user by rotating manual crank 94 drives axial drive shaft 92 and worm gear assembly 90. The worm gear assembly in turn drives hex shaft 86 and first and second wheels 84L and 84R. The radial projecting portions of the wheel engage the apertures in the aperture rails, thereby moving the separator means axially within the combine.

Upstanding plates 72L and 72R are provided with first and second guide wheels 96L and 96R, respectively. Guide wheels 96L and 96R ride on top of the guide rails. First and second guide pins 98L and 98R are located immediately below the guide wheels. The guide rails and guide pins are used to guide the axial movement of the separator into and out of the combine.

When the separator means is mounted inside of the combine, fender plate 54 abuts stop 100R which is mounted to side sheet 76R. There would also be a corresponding left stop, which is not illustrated in FIG. 2.

The rear portion of the axial separator means is held in place by angled locking brackets 102L and 102R which are provided with apertures which are aligned with an aperture on the aperture portion of the corresponding side rail. The locking assembly is best illustrated in FIG. 6. The locking bracket is bolted to the corresponding side rails by bolts 105L and 105R holding the rear of the combine in place. In FIG. 2, bracket 102L is illustrated as being separated from apertured rail 80L. This separation would not be present in a fully inserted separator module as bracket 102L would butt up against apertured rail 80L when the separator module is angled down inclined solid rails 82L and 82R. However, for purposes of clarity, these two elements have been illustrated as being separated.

Figure 3:
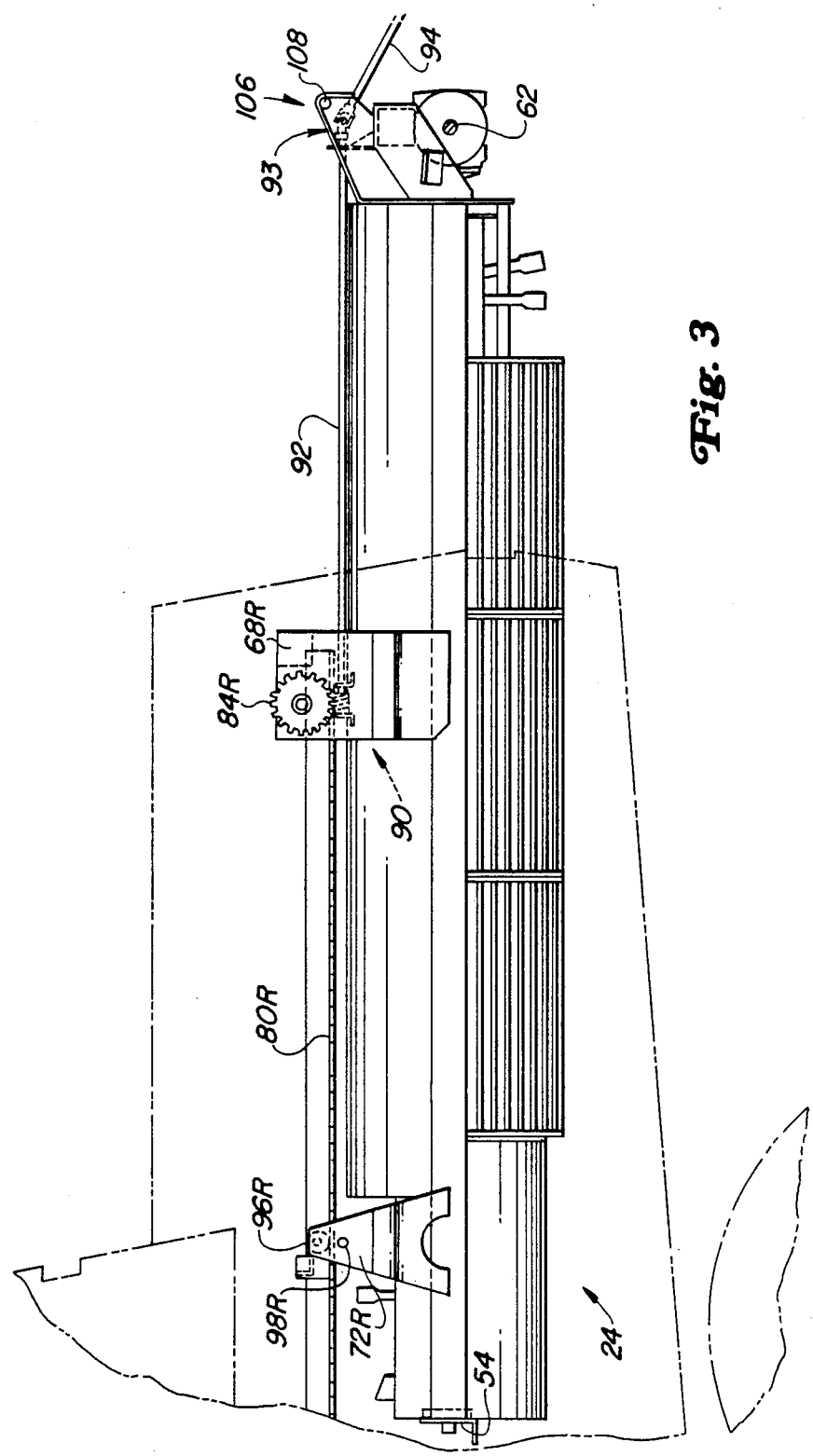
FIG. 3 is a side view of a partially removed separator module.

FIG. 3 illustrates the axial separator module being pulled partially out of the rear of the combine. It is at this position, where first and second wheels 84L and 84R reach the end of apertured rails 80L and 80R, that the axial separator would be lifted by another machine such as a fork lift, and removed from the combine. As such, the axial separator means is provided with a lifting assembly 106 including transverse pin 108 to which an attachment assembly is coupled. Such an attachment assembly is illustrated in FIGS. 4 and 5 and comprises a frame 110 that can be readily attached to a fork lift mast 112. The frame is provided with a hook 114 for engaging the transverse pin and an abutment tubular member 116 which transmits a force along the base of the axial separating means. This axial force can be transferred by axial members 118 and 120 throughout the axial separator frame.

The present invention should not be limited to the above described embodiment, but should be solely limited to the claims that follow.

I claim:

1. A self-propelled agricultural combine for harvesting a crop from a field, for threshing and separating the grain contained in that crop from straw and chaff, the combine comprising:
   a supporting structure having ground engaging wheels for supporting the supporting structure, the supporting structure having a front and back;
   a threshing means mounted on the supporting structure for threshing a harvested crop;
   an axial separating means that extends longitudinally within the supporting structure for separating the grain contained in the crop from straw; and
   means for readily removing the axial separating means axially through the back of the supporting structure.

2. An agricultural combine as defined by claim 1 wherein the means for readily removing comprises an axial track mounted to the supporting structure of the combine that extends adjacent and parallel to the axial separating means.

3. An agricultural combine as defined by claim 2 wherein the means for readily removing further comprises a first wheel mounted to the axial separating means, the wheel running on the axial track.

4. An agricultural combine as defined by claim 3 wherein the axial track comprises a first apertured rail mounted to the supporting structure.

5. An agricultural combine as defined by claim 4 wherein the first wheel is provided with radial projections that engage the apertures in the first apertured rail.

6. An agricultural combine as defined by claim 5 wherein the means for readily removing further comprises a second wheel mounted to the axial separating means and the axial track further comprises a second apertured rail mounted to the supporting structure, whereby the second wheel is provided with radial projections that engage the apertures in the second apertured rail.

7. An agricultural combine as defined by claim 6 wherein the means for readily removing further comprises first and second guide wheels located at the front of the axial separating means which ride on top of the first and second rails respectively.

8. An agricultural combine as defined by claim 7 wherein the means for readily removing further comprises first and second guide pins located opposite the first and second guide wheels being located below the first and second rails.

9. An agricultural combine as defined by claim 4 wherein the means for readily removing comprises a drive means for driving the axial separating means axially along the axial track.

10. An agricultural combine as defined by claim 9 wherein the drive means comprises a worm gear assembly mounted to axial separating means for driving the first wheel.

11. An agricultural combine as defined by claim 10 wherein the worm gear assembly is provided with an axial drive shaft that extends to the back of the axial separating means.

12. An agricultural combine as defined by claim 11 wherein the axial drive shaft is provided with a coupling for coupling the axial drive shaft to a manual crank arm.

13. An agricultural combine as defined by claim 9 wherein the means for readily removing comprises a locking means for locking the axial separating means to the supporting structure.

14. An agricultural combine as defined by claim 13 wherein the locking means comprises a locking bracket mounted to the axial separating means having a locking aperture which is aligned with an aperture in the first apertured rail, a locking bolt passes through the first apertured rail and the locking aperture to lock the axial separating means to the supporting structure.

15. An agricultural combine as defined by claim 13 wherein the axial separating means further comprises a lifting assembly located at the back of the axial separating means.

16. An agricultural combine as defined by claim 15 wherein the lifting assembly comprises a transverse pin.

* * * * *